(12) United States Patent
Akhtar et al.

(10) Patent No.: US 12,382,387 B2
(45) Date of Patent: Aug. 5, 2025

(54) MANAGEMENT OF ON-OFF STATES FOR A GROUP OF RADIOS

(71) Applicant: Arista Networks, Inc., Santa Clara, CA (US)

(72) Inventors: Nadeem Akhtar, Navi Mumbai (IN); Preyas Hathi, Pune (IN)

(73) Assignee: Arista Networks, Inc., Santa Clara, CA (US)

( * ) Notice: Subject to any disclaimer, the term of this patent is extended or adjusted under 35 U.S.C. 154(b) by 324 days.

(21) Appl. No.: 18/081,215

(22) Filed: Dec. 14, 2022

(65) Prior Publication Data

US 2024/0205822 A1   Jun. 20, 2024

(51) Int. Cl.
*H04W 52/02*   (2009.01)
*H04W 52/26*   (2009.01)
*H04W 52/36*   (2009.01)

(52) U.S. Cl.
CPC ..... *H04W 52/0206* (2013.01); *H04W 52/265* (2013.01); *H04W 52/367* (2013.01)

(58) Field of Classification Search
None
See application file for complete search history.

(56) References Cited

U.S. PATENT DOCUMENTS

| | | | |
|---|---|---|---|
| 2016/0057703 A1* | 2/2016 | Benoit | H04W 56/00 370/311 |
| 2017/0273017 A1* | 9/2017 | Gidvani | H04W 24/10 |
| 2017/0311269 A1* | 10/2017 | Hardt | H04W 52/0206 |

* cited by examiner

*Primary Examiner* — Robert M Morlan
(74) *Attorney, Agent, or Firm* — Treyz Law Group, P.C.; Tianyi He

(57) ABSTRACT

Control circuitry may be configured to determine on-off states of radios in wireless access points. The control circuitry may determine a transmit power for each radio in the set of radios, identify a subset of radios from the set for which the one or more determined transmit powers are less than a transmit power threshold, turn off each radio in the subset of radios, and determine updated transmit powers for the set of radios excluding the subset of radios.

20 Claims, 11 Drawing Sheets

| RADIO(S) - ON | RADIO(S) - OFF |
|---|---|
| R1<br>R2<br>R3<br>R5<br>R7<br>R15 | R4<br>R6<br>R8<br>R9<br>R10<br>R11<br>R12<br>R13<br>R14<br>R16 |

FIG. 3B

| RADIO(S) - ON | RADIO(S) - OFF |
|---|---|
| R1<br>R2<br>R3<br>R5<br>R7<br>R12<br>R15 | R4<br>R6<br>R8<br>R9<br>R10<br>R11<br>R13<br>R14<br>R16 |

FIG. 3C

| RADIO IDENTIFIER | LOUD NEIGHBOR COUNT | RF NEIGHBOR COUNT | INITIAL TX POWER (dBm) | UPDATED TX POWER (dBm) |
|---|---|---|---|---|
| R1 | 15 | 15 | 17 | 4 |
| R2 | 15 | 15 | 17 | 4 |
| R3 | 15 | 15 | 17 | 5 |
| R4 | 15 | 15 | 17 | 2 |
| R5 | 15 | 15 | 17 | 4 |
| R6 | 15 | 15 | 17 | 2 |
| R7 | 15 | 15 | 17 | 4 |
| R8 | 15 | 15 | 17 | 0 |
| R9 | 15 | 15 | 17 | 1 |
| R10 | 15 | 15 | 17 | 0 |
| R11 | 15 | 15 | 17 | 0 |
| R12 | 15 | 15 | 17 | 2 |
| R13 | 15 | 15 | 17 | 2 |
| R14 | 15 | 15 | 17 | 2 |
| R15 | 15 | 15 | 17 | 5 |
| R16 | 15 | 15 | 17 | 2 |

FIG. 4

| RADIO IDENTIFIER | LOUD NEIGHBOR COUNT | RF NEIGHBOR COUNT | PRE-ADJUSTMENT TX POWER (dBm) |
|---|---|---|---|
| R1 | 5 | 5 | 4 ←—68 |
| R2 | 5 | 5 | 4 ←—68 |
| R3 | 3 | 5 | 5 |
| R4 | 0 | 0 | OFF |
| R5 | 3 | 5 | 4 |
| R6 | 0 | 0 | OFF |
| R7 | 2 | 5 | 4 |
| R8 | 0 | 0 | OFF |
| R9 | 0 | 0 | OFF |
| R10 | 0 | 0 | OFF |
| R11 | 0 | 0 | OFF |
| R12 | 0 | 0 | OFF |
| R13 | 0 | 0 | OFF |
| R14 | 0 | 0 | OFF |
| R15 | 5 | 5 | 5 ←—68 |
| R16 | 0 | 0 | OFF |

| RADIO IDENTIFIER | POST ADJUSTMENT POWER (dBm) |
|---|---|
| R1 | 17 ←— 84 |
| R2 | 17 ←— 84 |
| R3 | 5 |
| R4 | OFF |
| R5 | 4 |
| R6 | OFF |
| R7 | 4 |
| R8 | OFF |
| R9 | OFF |
| R10 | OFF |
| R11 | OFF |
| R12 | OFF |
| R13 | OFF |
| R14 | OFF |
| R15 | 17 ←— 84 |
| R16 | OFF |

FIG. 6

MANAGEMENT OF ON-OFF STATES FOR A GROUP OF RADIOS

BACKGROUND

This relates to wireless networks, and more particularly, to one or more wireless access points in wireless networks.

A network can include numerous wireless access points (APs) that wirelessly connect to one or more client devices. Using these wireless connections, the client devices can connect to the network through the access points. Access points and client devices can communicate wirelessly in different radio-frequency bands (e.g., based on Wi-Fi protocols).

BRIEF DESCRIPTION OF THE DRAWINGS

FIGS. 3A-3C are diagrams of illustrative radio on-off state information in accordance with some embodiments.

FIG. 4 is a table of illustrative radio performance characteristics associated with initial configurations of a set of radios in accordance with some embodiments.

FIG. 5 is a table of illustrative radio performance characteristics associated with updated configurations of a set of radios in which some radios are in an off state in accordance with some embodiments.

FIG. 6 is a table of illustrative radio performance characteristics associated with further updated configurations of some radios in a set of radios that are in an on state in accordance with some embodiments.

DETAILED DESCRIPTION

Figure 1:
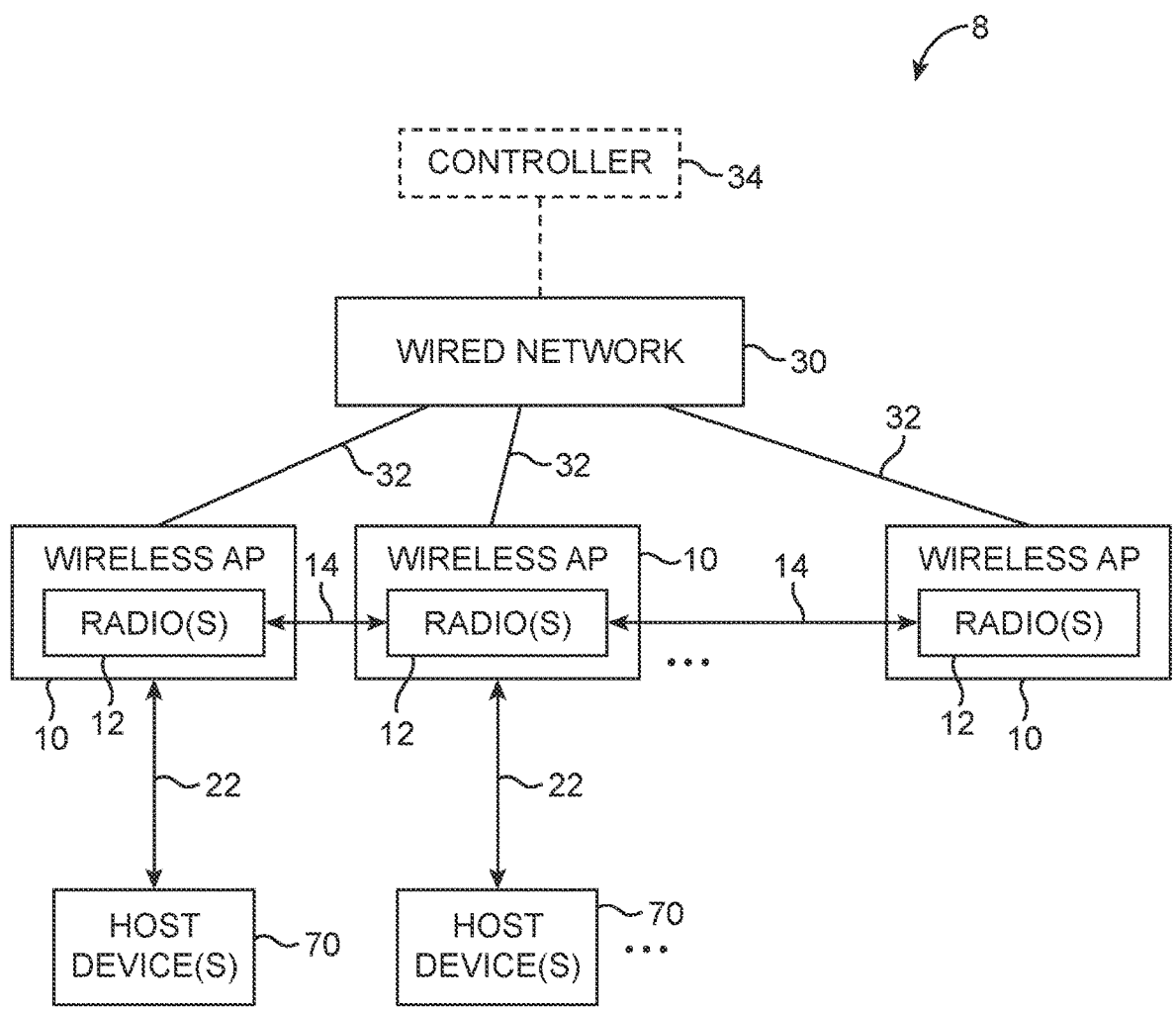
FIG. 1 is a diagram of an illustrative network that includes access points wirelessly connected to client devices in accordance with some embodiments.

A network can convey network traffic, e.g., in the form of packets encapsulated by frames, for host devices. Host devices may be coupled to network devices in the network such as wireless access points and, through these network devices, may be connected to other network portions such as the Internet.

A group of wireless access points (e.g., access points in the Wi-Fi or WLAN (wireless local area network) context or base stations in the cellular context) may be used to provide wireless communication coverage across a geographical area. Each wireless access point may contain one or more radios for covering different radio-frequency bands such as a 2.4 GHz frequency band, a 5.0 GHz frequency band, and/or a 6.0 GHz frequency band.

When a set of wireless access points are deployed at a particular geographical location to provide wireless coverage, there can often be scenarios in which radio coverage for a particular frequency band is excessive. Consider an example in which wireless access points are deployed at a location to provide satisfactory 5.0 GHz WLAN frequency band coverage. In this example, assuming that each deployed wireless access point can also provide 2.4 GHz frequency band coverage (in addition to 5.0 GHz WLAN frequency band coverage), coverage for the lower propagation loss and longer-range 2.4 GHz frequency band may be excessive (e.g., coverage provided by access points may have excessive overlap) given that deployment was based on providing the higher propagation loss and shorter-range 5.0 GHz frequency band.

While illustrated in the above scenario using the 2.4 GHz and 5.0 GHz WLAN frequency bands as an example, these issues of excessive wireless coverage overlap may similarly occur with other WLAN frequency bands (e.g., coverage for the 2.4 and/or 5.0 GHz frequency bands may be excessive when access point locations are planned for satisfactory 6.0 GHz frequency band coverage). Furthermore, these issues may similarly be present with other radio technologies (e.g., other radio-frequency bands) outside of WLAN such as with cellular technologies or across different cellular frequency bands. As an example, a group of cellular wireless access points (sometimes referred to as base stations) may be designed and/or deployed across a geographical area to achieve satisfactory wireless coverage for a particular frequency band or set of frequency bands but may exhibit excessive wireless coverage in another frequency band or another set of frequency bands.

To efficiently provide a satisfactory amount of wireless coverage for one or more frequency bands (e.g., especially those frequency bands for which physical deployment of access points was not designed around), one or more radios in the group of wireless access points may be turned off (or on in some scenarios). The operating parameters of radios in the group of wireless access points may further be adjusted (e.g., transmit power may be increased) to account for the radios that were turned off. Configured in this manner, a group of radios may provide satisfactory wireless coverage across one or more radio-frequency bands while reducing co-channel interference (CCI) between access points for a particular radio-frequency band (e.g., the 2.4 GHz frequency band in the above example) and also reducing wireless access point power consumption.

Configurations in which wireless access points for a WLAN are configured to provide satisfactory wireless coverage are sometimes described herein as an illustrative example. If desired, these configurations may similarly apply to other types of wireless access points (e.g., cellular base stations). An illustrative networking system having a group of wireless access points that employ the above-mentioned scheme to provide satisfactory wireless coverage is shown in FIG. 1.

In particular, as shown in FIG. 1, an illustrative network such as network 8 may contain one or more wireless access points such as wireless access points 10. In general, any suitable number of access points may exist at one or more geographical locations to extend the wireless connectivity (coverage) supported by network 8.

Each wireless access point 10 may wirelessly connect, through corresponding wireless communication links 22, to one or more host or client devices 20 (sometimes referred to as user equipment 20) such as desktop computers, servers, portable electronic devices such as cellular telephones or smartphones, tablet computers, laptop computers, etc., network service devices, management equipment that manage and control the operation of one or more of other host devices 20 or access points 10, specialized or general-purpose host computing equipment that run client-side and/or server-side applications, and/or other devices that enable WLAN connectivity and/or cellular connectivity. Through wireless access point 10, a connected host device 20 can thereby connect to network 8.

Network 8 may be implemented with any suitable scope (e.g., as a local area network (LAN), as a campus area network, as a wide area network, etc.) and may include any suitable number and/or types of network devices, at least some of which are connected by one or more wired technologies or standards such as Ethernet (e.g., using copper cables and/or fiber optic cables), thereby forming wired network portion 30 to which the wireless network portion provided by access points 10 is connected. In some illustrative configurations described herein as an example, network portion 30 may be implemented using one or more network devices 10 that handle network traffic such as the processing of layer 2 (L2) network frames and/or the processing of layer 3 (L3) network packets for conveying information for user applications and/or other processes for traffic between different end hosts (e.g., between, to, and/or from host devices 20). In general, network portion 30 may include network devices such as one or more switches, one or more bridges, one or more routers, one or more hubs, one or more repeaters, one or more firewalls, one or more devices serving other networking functions, one or more devices that include the functionality of two or more of these devices, and management equipment that control the operation of one or more of these network devices and/or access points 10.

If desired, network 8 (e.g., wired portion 30) may include internet service provider networks (e.g., the Internet) or other public service provider networks, private service provider networks (e.g., multiprotocol label switching (MPLS) networks), and/or other types of networks such as telecommunication service provider networks (e.g., a cellular network such as a long term evolution (LTE) network, a 5G network, etc.).

In some illustrative examples described herein as an example, wireless communication links 22 may be based on IEEE 802.11 standards and Wi-Fi protocols for implementing wireless local area network (WLAN) communications. In other examples, wireless communication links 22 may be cellular communication links (e.g., based on one or more standards as described in the 3GPP specifications such as GSM, UMTS, LTE, 5G, etc.). Data communicated between a pair of wireless access point 10 and host device 20 through a corresponding wireless communication link 22 may be further conveyed to and from other parts of network 8 (e.g., network portion 30) using a corresponding wired path 32 such as an Ethernet connection.

The group of wireless access points 10 shown in FIG. 1 may be deployed at various locations within a geographical area to provide wireless coverage to network 8 for host devices 20 in the geographical area. As an example, the group of access points 10 may be located within the same floor of a building, within the same building, within different buildings in the same campus, across a city or metropolitan area, or may span an even larger area.

If desired, a wireless access point controller (sometimes referred to as a wireless controller) such as controller 34 may be coupled to the group of wireless access points 10. In particular, wireless controller 34 may provide centralized control to the group of wireless access points 10 (e.g., through wired network portion 30 and wired paths 32 in the example of FIG. 1). If desired, wireless controller 34 may be omitted or may be coupled to one or more access points 10 in a configuration different from the configuration shown in FIG. 1.

If present, controller 34 may provide configuration information, control signals, and/or other data to one or more access points 10 in the group to control the operational settings of the coupled access point 10. As examples, controller 34 may provide control signals and/or configuration information that place one or more radios in each selected wireless access point 10 in an on or off state, that adjust (e.g., increase or decrease) the transmit powers of one or more radios in each selected wireless access point 10, that configure or control each selected wireless access point to gather and report performance metrics, and/or generally perform other processing operations (e.g., the operations described in connection with FIGS. 2-10). Wireless controller 34 may thereby provide management functions for wireless access points 10 to coordinate their operations. In other configurations (e.g., where controller 34 is omitted), wireless access points 10 may communicate with each other to coordinate their operations and/or may operate independently (e.g., when performing the operations described in connection with FIGS. 2-10).

Each wireless access point 10 may include multiple radios 12 such as a combination of a radio for transmitting and receiving radio-frequency signals in a 2.4 GHz frequency band, a radio for transmitting and receiving radio-frequency signals in a 5.0 GHz frequency band, a radio for transmitting and receiving radio-frequency signals in a 6.0 GHz frequency band for a WLAN. In cellular configurations, each wireless access point 10 may include different radios for covering different cellular frequency bands. Different radios 12 on the same wireless access point 10 may be implemented on a shared integrated circuit die or die package, may include common shared components therebetween, and/or may be separately implemented (e.g., on separated integrated circuit dies or packages). Each radio-frequency band may include multiple channels. Radios 12 for the same radio-frequency band in different wireless access points may operate on one or more of the same or different radio-frequency channels in the same radio-frequency band.

Each radio 12 may use antennas to convey (e.g., transmit and/or receive) radio-frequency signals in the corresponding radio-frequency band (e.g., in one or more radio-frequency channels of the radio-frequency band). Configurations in which each wireless access point 10 includes multiple radios for covering at least a first radio-frequency band and a second radio-frequency band that includes (at least some) frequencies lower than those in the first radio-frequency band are sometimes described herein as an example. The deployment of wireless access points 10 at physical locations across a geographical area may therefore provide a first group of radios for covering multiple channels in the first radio-frequency band across the geographical area and may therefore provide a second group of radios for covering multiple channels in the second radio-frequency band. In general, each wireless access point 10 may include any number of radios 12.

One or both (or more) of radios 12 in each wireless access point 10 may communicate with corresponding host devices 20 via communication links 22 based on radio-frequency signals in the first and/or second frequency bands (and/or other radio-frequency bands covered by radios 12). Each radio 12 in each wireless access point 10 may also detect (e.g., receive) radio-frequency signals from other radios 12 in other wireless access point 10 in the group of wireless access points via communication links 14. If desired, each radio 12 may use communication links 14 to detect proximity of neighboring radios 12 covering the same radio-frequency band (e.g., based on received signal strength) and therefore indicate the wireless coverage for the radio-frequency bands across a geographical area.

Figure 2:
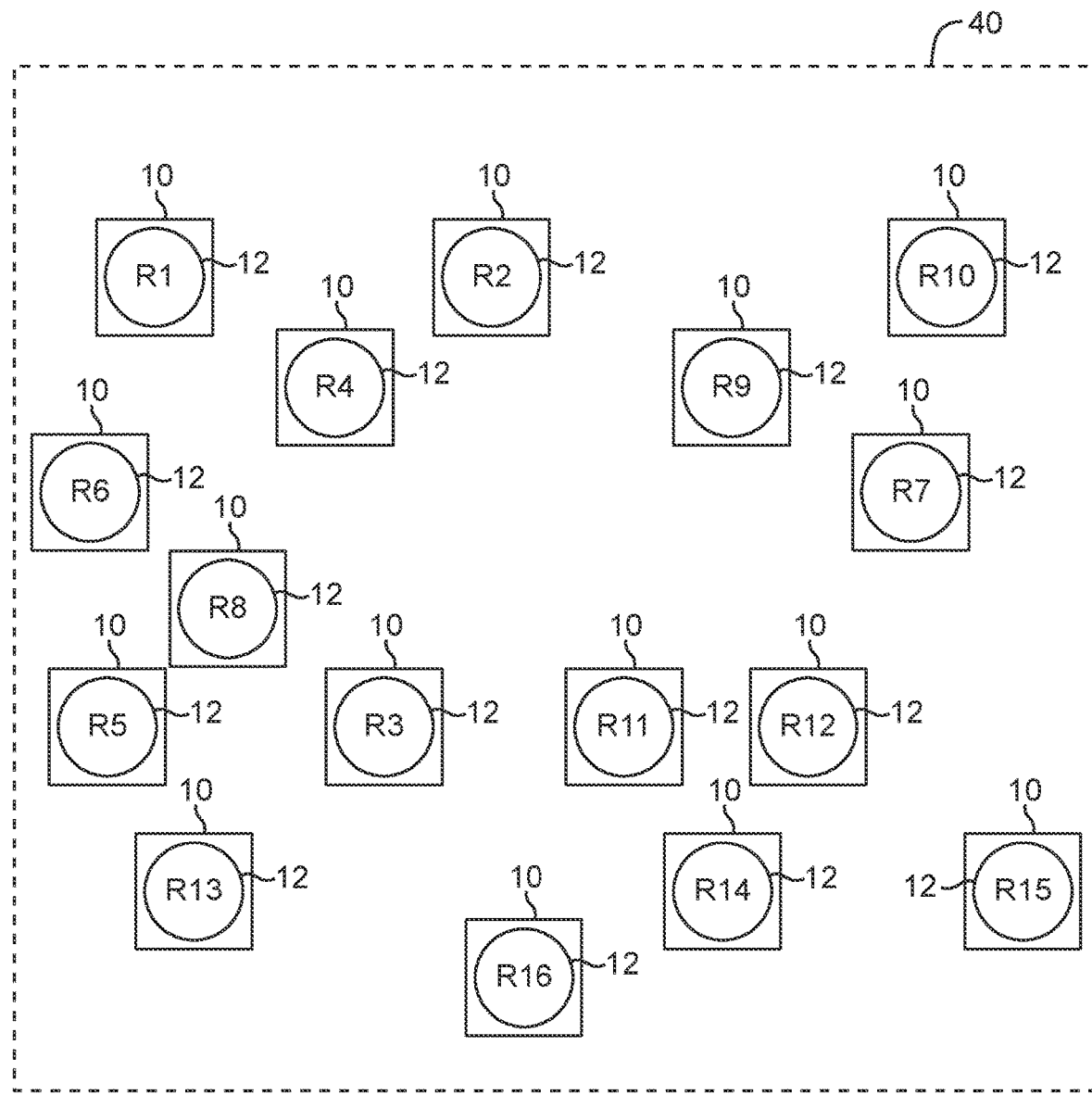
FIG. 2 is a diagram of an illustrative arrangement of a set of radios for access points in accordance with some embodiments.

FIG. 2 is a diagram of an illustrative group of wireless access points 10 having radios 12 placed at various locations across a geographical area such as area 40 (e.g., spanning an office, spanning a floor of a building, spanning a multi-floor building, spanning different buildings on a campus, spanning a city or metropolitan area, or spanning an even larger area). In the example of FIG. 2, a group of radios 12 (respectively labeled R1-R16) for covering the same radio-frequency band (e.g., a 2.4 GHz WLAN band, a 5.0 GHz WLAN band, a 6.0 GHz WLAN band, a cellular radio-frequency band, etc.) is provided to provide wireless coverage for that frequency band across area 40. In the example of FIG. 2, each of radios R1-R16 may be implemented within a corresponding wireless access point 10.

In one illustrative scenario, radios R1-R16 may be configured to provide coverage for a 2.4 GHz WLAN frequency band. The 2.4 GHz WLAN frequency band coverage afforded by radios R1-R16 can be excessive when the physical deployment or placement of each wireless access point 10 containing other radio(s) for covering one or more other WLAN frequency bands (e.g., 5.0 GHz WLAN frequency band, 6.0 GHz WLAN frequency band, etc.) is optimized for those one or more frequency bands covered by other radio(s). The placement of wireless access points 10 may be fixed to provide the optimal wireless coverage for other frequency bands covered by other radios (not shown in the example of FIG. 2) implemented on each wireless access point 10. In other words, wireless access point(s) 10 should not typically be removed from operation in its entirety from area 40 because it would adversely affect wireless coverage of the other frequency bands covered by the other radios in the removed wireless access point(s) 10.

Given the constraint of needing to place each wireless access point 10 at a corresponding location as indicated in area 40, it may therefore be desirable to determine a subset of radios R1-R16 that can be turned off (e.g., a subset of radios for covering the 2.4 GHz frequency band). Doing so may help reduce co-channel interference (e.g., crosstalk between different radios operating using the same channel) in the 2.4 GHz frequency band and/or reduce wireless access point power consumption.

This scenario in which the 2.4 GHz WLAN wireless coverage is excessive and therefore warrants the shutting off of certain 2.4 GHz WLAN radios is merely illustrative. In other scenarios (e.g., radios 12 in FIG. 2 covering other frequency bands), wireless coverage for other WLAN or non-WLAN frequency bands may be excessive and may warrant the shutting off of corresponding radios. In yet other scenarios, wireless coverage for a given frequency band may be lacking (e.g., one or more of radios R1-R16 may already be turned off) and it may be desirable to determine which one or more corresponding radios (e.g., one or more radios R1-R16 that are turned off) may be turned on to boost wireless coverage. In general, the systems and/or operations described herein may be used to efficiently assess wireless coverage for a given radio-frequency band and determine on-off states of radios for the given radio-frequency band to provide a desirable extent of wireless coverage across area 40 (e.g., in consideration of co-channel interference, wireless access point power consumption, constraints of already deployed access points, etc.).

Figure 3A:
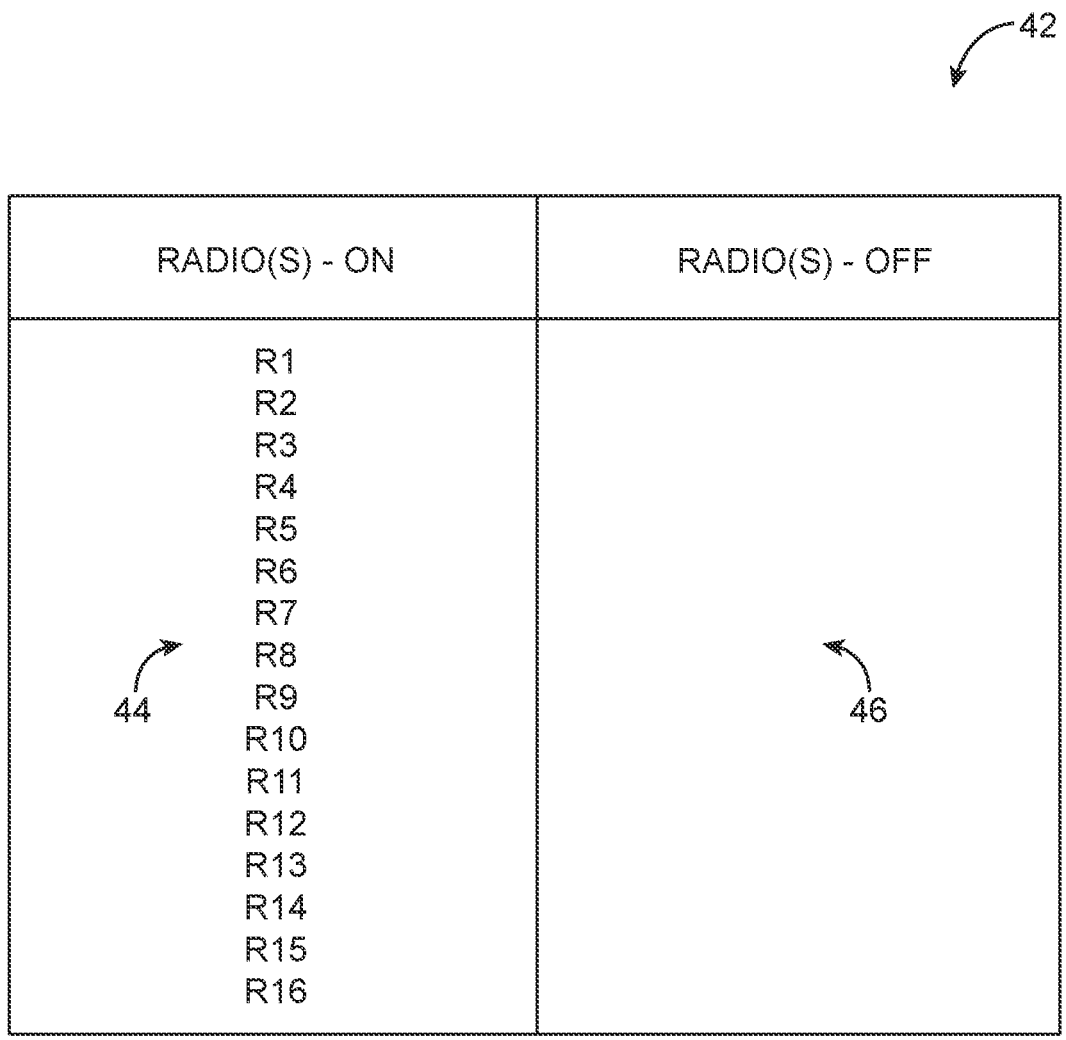

FIGS. 3A-3C are diagrams of illustrative sets of radio on-off states with which radios R1-R16 in the example of FIG. 2 can operate. The radio state information depicted in FIGS. 3A-3C may be maintained (e.g., stored and updated) at each wireless access point 10 and/or controller 34. As described herein, placing a given radio in an on state may include turning on the radio, supplying power to one or more radio components, providing an input signal based on which a radio-frequency signal is generated, providing operating parameters for the radio (e.g., a transmit power, one or more radio-frequency channels for operation, etc.) and/or generally performing operations that configure the radio to transmit and receive radio-frequency signals. Placing a given radio in an off state may include turning off the radio, removing power supply coupling to one or more radio components, prevent an input signal based on which a radio-frequency signal is generated from being received, removing operating parameters for the radio (e.g., a transmit power, one or more radio-frequency channels for operation, etc.) and/or generally performing other operations that configure the radio to power off or lower power consumption and to not transmit or receive radio-frequency signals.

As a first example shown in table 42 of FIG. 3A, all radios R1-R16 may (initially) operate in an on state (e.g., with varying transmit power). In other words, list 44 of radios in an on state may include all radios R1-R16, while list 46 of radios in an off state may be an empty list. However, operating radios R1-R16 using the on-off states shown in table 42 of FIG. 3A may lead to excessive wireless coverage, thereby resulting in co-channel interference and excessive power consumption (as examples).

To mitigate these issues, a number of radios R1-R16 may be selected as candidate radios to be turned off. As a second example shown in table 42 of FIG. 3B, table 42 may be updated to include a (candidate) list of radios to be turned off such as radios R4, R6, R8-R14, and R16 that were moved from list 44 to list 46. In some illustrative configurations described herein as an example, updated table 42 in FIG. 3B may indicate the finalized on-off states of radios. As such, radios R1-R16 may be operated using the on-off states shown in table 42 of FIG. 3B to reduce co-channel interference while providing sufficient wireless coverage.

In other illustrative scenarios, updated table 42 in FIG. 3B may be insufficient to provide satisfactory wireless coverage. Accordingly, table 42 in FIG. 3B may further be refined by moving one or more radios off of list 46 to list 44 (e.g., as indicated by arrow 48), thereby reducing the number of radios in the off state in an attempt to provide satisfactory wireless coverage while still reducing co-channel interference. In the example of FIG. 3C, radio R12 may be moved from list 46 to list 44 to generate a refined table 42' (e.g., as an alternative to table 42 in FIG. 3B). In these illustrative scenarios, tables further refined from table 42 in FIG. 3B such as table 42' in FIG. 3C may indicate the finalized on-off states of radios.

If desired, the selection of radios to be placed in an off state (e.g., placed in list 46 of FIG. 3B) and the refinement of radios to be placed in an off state (e.g., the difference between table 42 in FIG. 3B and 42' in FIG. 3C) may be based on operating characteristics of the group of radios.

FIG. 4 shows a table 50 of illustrative operating characteristics of a group of radios covering the same radio-frequency band across a given area for wireless coverage (e.g., radios R1-R16 shown in FIG. 2). Each given radio 12 may have or be associated with a loud neighbor count indicated in column 52. The loud neighbor count may be equal to or may be indicative of the number of other radios 12 in the group that receive radio-frequency signals (e.g., via link 14 in FIG. 1) transmitted by that given radio 12 above a loud threshold level (e.g., a first received signal strength indicator (RSSI) threshold level).

Each given radio 12 may also have or be associated with a radio-frequency (band) neighbor count indicated in column 54. The radio-frequency neighbor count may be equal to or may be indicative of the number of other radios 12 in the group that receive radio-frequency signals (e.g., via link 14 in FIG. 1) transmitted by that given radio 12 above a radio-frequency neighbor threshold level (e.g., a second RSSI threshold level lower than the first RSSI threshold level associated with the loud neighbor count). In general, the radio-frequency count may be indicative of all other radios in the group deployed at a geographical area (e.g., area 40 in FIG. 2) and configured to collectively provide wireless coverage across the geographical area, while the loud neighbor count may be indicative of a subset of all other radios in the group that are most proximal (e.g., as assessed through received signal strength). As such, the loud neighbor count may be used to indicate the radio density and overlapping wireless coverage near a particular radio. As an example, a higher loud neighbor count may indicate a denser region of radios and higher overlapping wireless coverage.

Each given radio 12 may also exhibit or operate with a transmit power, which may initially be at a first transmit power (e.g., an initial transmit power as shown in column 56). In the example of FIG. 4, when all radios 12 in the group are transmitting using an initial TX power of 17 dBm (e.g., a maximum transmit power of each radio 12), each radio 12 may be perceived by all other radios as a radio-frequency neighbor (e.g., receives signals from that radio above a radio-frequency neighbor RSSI threshold) and therefore have a radio-frequency neighbor count of 15. In this example, each radio 12 may also be perceived by all other radios as a loud neighbor (e.g., receives signals from that radio above a loud neighbor RSSI threshold) and therefore also have a loud neighbor count of 15. When the initial transmit power is relatively high (e.g., at 17 dBm), the loud neighbor count for each radio may similarly be high (e.g., at 15, which includes all other radios in the group) given the high received signal strength based on the high transmit power. In this example, the wireless coverage provided by the group of radios R1-R16 each operating with the initial (e.g., maximum) transmit power may be excessive as wireless coverage overlaps significantly. In other words, it may be desirable to reduce the transmit powers of radios R1-R16 to reduce power consumption while still providing a satisfactory amount of wireless coverage (e.g., as measured by a minimum loud neighbor count threshold).

As such, based on these three parameters (e.g., a loud neighbor count, a radio-frequency neighbor count, and an initial transmit power) and other transmit power control parameters (e.g., a minimum transmit power of each radio 12, a maximum transmit power of each radio 12, a desired minimum loud neighbor count threshold to be maintained for satisfactory wireless coverage, an offset parameter to tune how aggressive or conservative (in terms of wireless coverage overlap between radios) the wireless coverage should be, etc.), an updated transmit power can be obtained for each radio (e.g., as shown in column 58). The updated transmit power may help reduce power consumption of radios 12 while providing satisfactory wireless coverage. If desired, controller 34 and/or each access point 10 may determine the updated transmit power for one or more radios and/or control the one or more radios to operate using the updated transmit power.

Accordingly, to reduce the transmit power of one or more radios R1-R16, controller 34 and/or one or more access points 10 may identify and set a target loud neighbor count threshold (e.g., based on input from a network administrator or user indicative of the target loud neighbor count threshold). The target loud neighbor count threshold may be determined based on a desired loud neighbor count and an offset parameter (e.g., usable to tune or adjust how much excessive overlap wireless coverage should provide).

In one illustrative example, the desired loud neighbor count may have a default value, whereas the offset parameter (e.g., a whole number) may be based on user input. The sum of the desired loud neighbor count and the offset parameter may be the target loud neighbor count threshold. To achieve the target loud neighbor count threshold, the transmit powers of radios R1-R16 may be reduced (e.g., from their initial transmit powers as shown in column 56) until the target loud neighbor count is met by one or more radios R1-R16 but not exceeded by any radios R1-R16. In other words, in an example where the target loud neighbor count threshold is two, a set of transmit powers for radios R1-R16 are generated such that no radio in the group of radios has a loud neighbor count lower than two and at least some of the radios in the group have a loud neighbor count of two. An illustrative set of resulting (updated and optimized) transmit powers for radios R1-R16 are shown in column 58 of FIG. 4.

The steps for determining the updated transmit powers for the set of radios R1-R16 based on the target loud neighbor count threshold and/or other parameters may sometimes be referred to as a transmit power control operation or algorithm. The transmit power control operation, whether performed at a controller 34 or at one or more (e.g., all) of access points 10, may generally use, as inputs, parameters such as a target loud neighbor count threshold (e.g., a desired minimum loud neighbor count to be maintained for satisfactory wireless coverage, an offset parameter to tune how aggressive or conservative coverage overlap should be) for one or more radios, a current loud neighbor count for one or more radios, a current radio-frequency neighbor count for one or more radios, an initial transmit power for one or more radios, a minimum transmit power for one or more radios, and/or a maximum transmit power for one or more radios to provide updated transmit power(s) for one or more radios in the group. The transmit power control operation may utilize an iterative process in which loud neighbor counts are observed and compared to the target loud neighbor count threshold and the transmit powers are iteratively adjusted until the optimized transmit powers are obtained, may utilize a numerical method to calculate the optimized transmit powers as a function of the input parameters, and/or may utilize other processes or methods to generate the set of updated transmit powers.

The operation of radios R1-R16 may further be optimized by placing one or more of radios R1-R16 in an off state (as an example). Placing a radio in an off state differs from reducing the transmit power to its minimum transmit power as even when operating using its minimum transmit power, the radio may still transmit radio-frequency signals. In particular, even when the transmit power provided by a radio is at the minimum setting, the overall transmit power of the wireless communication system for that radio-frequency band may still be non-zero (e.g., due to portions of the wireless communication having a non-zero inherent transmit power, leakage, and/or other non-idealities). As such, by placing a radio in an off state, power may be removed from the radio (as an example) and corresponding radio components may be powered off.

To determine which of radios R1-R16 are to be placed in an off state, controller 34 and/or wireless access points 10 may refer to the corresponding optimized transmit powers of radios R1-R16 as shown in column 58 of FIG. 4. In particular, when transmit power is updated (e.g., to achieve a target loud neighbor count threshold within the group of radios), the magnitudes of transmit power may differ across radios in the group. In particular, one or more radios in regions of area 40 (FIG. 2) sparsely populated with other radios in the group may have relatively high updated transmit powers, whereas one or more radios in other regions of area 40 more densely populated with other radios in the group may have relatively low updated transmit powers. Accordingly, one or more radios in the more densely populated regions of area 40 may be candidates for being placed in an off state.

In other words, controller 34 and/or wireless access points 10 may identify one or more of radios R1-R16 having updated transmit powers (e.g., as indicated in column 58 of FIG. 4) below a transmit power threshold. Radios having updated transmit powers lower than the transmit power threshold may be candidates in the group of radios for being placed in an off state. The threshold transmit power may be adjustable over time (e.g., dynamically in response to changing system parameters, based on user input, etc.) or may be fixed.

In one illustrative example, the transmit power threshold may be 3 dBm. When this illustrative transmit power threshold is applied to the group of radios R1-R16 and the illustrative optimized transmit powers shown in column 58 of FIG. 4, controller 34 and/or wireless access points 10 may identify radios R4, R6, R8-R14, and R16 as candidates for placing in an off state or being turned off (e.g., due to their updated transmit powers being lower than the transmit power threshold of 3 dBm). As described herein, radios 12 to be turned off are sometimes referred to herein as candidate radios 12' (e.g., radios R4, R6, R8-R14, and R16).

While turning off radios 12' may reduce issues with co-channel interference and reduce power consumption, turning off these candidate radios may also be insufficient to provide the desired extent of wireless coverage. As such, the operation of radios in the group excluding the candidate radios 12' (e.g., with radios 12' turned off) may be tested or otherwise assessed to determine whether satisfactory wireless coverage would still be provided with these candidate radios 12' turned off.

FIG. 5 shows a table 60 of illustrative operating characteristics of a group of radios 12 with candidate radios 12' turned off (e.g., radios R1-R16 as shown in FIG. 2 with radios R4, R6, R8-R14, and R16 turned off). In the example of FIG. 5, since the group of radios only includes six radios 12 that are on, each radio in the on state may have an RF neighbor count in column 64 that is indicative of all other active radios in the group (e.g., five other radios 12).

As shown in FIG. 5, all radios 12 kept on in the group may each still maintain a loud neighbor count (as indicated in column 62 of table 60) that meets or satisfies the target loud neighbor count threshold (e.g., the loud neighbor count of each radio 12 kept on is greater than or equal to a target loud neighbor count threshold of two). If desired, other criteria may be used to determine whether the wireless coverage is satisfactory when each of the candidate radios 12' are turned off.

While the above example illustrates a scenario in which radios 12' can all be turned off to still achieve satisfactory wireless coverage (e.g., using a criterion based on the target loud neighbor count threshold), this may not always be the case. In some illustrative scenarios where one or more radios 12 have a loud neighbor count less than the target loud neighbor count threshold (e.g., two in the above example), one or more of the turned-off candidate radios 12' may be turned back on to enable the group of radios to better satisfy the criterion based on the target loud neighbor count threshold (or other wireless coverage criteria) and thereby provide satisfactory wireless coverage.

In other words, the original list of candidate radios 12' (to be turned off) may be updated to remove one or more of radios 12' to generate an updated candidate list of radios (to be turned off). The removed radios may then be used in providing satisfactory wireless coverage. This type of update to the candidate list of radios 12' to be turned off was illustrated in connection with FIG. 3C with respect to FIG. 3B in which radio R12 (as an example) was removed from list 46 of radios in the off state in FIG. 3B to generate updated list 46 of radios in the off state in FIG. 3C. The new updated candidate list of radios may further be tested (by turning off candidate radios in this updated list) to determine whether the target loud neighbor count threshold or other wireless coverage criteria can be satisfied. Any suitable number of updates to the candidate list of radios 12' may occur across a corresponding number of iterations. In other words, this provides an iterative approach to finalize a set of candidate radios for turning off.

If desired, one or more criteria may be used to preferentially remove, through each of these iterations, certain types of radios (e.g., radios having certain characteristics) from the list of candidate radios to be turned off. These one or more criteria may be based on the updated transmit powers of the candidate radios (e.g., candidate radios having a higher updated transmit power, e.g., as shown in column 58 in FIG. 4, may be removed from the candidate list prior to or at an earlier iteration than candidate radios having a lower updated transmit power), may be based on proximity of candidate radios to a radio that does not meet the target loud neighbor count threshold (e.g., candidate radios that are closer in location to the radio that did not meet the target loud neighbor count threshold may be removed from the candidate list prior to or at an earlier iteration than candidate radios that are farther in location), may be based on the maximum and/or minimum transmit power of candidate radios (e.g., candidate radios having a higher maximum transmit power may be removed from the candidate list prior to or at an earlier iteration than candidate radios that have a lower maximum transmit power) and/or may be based on any other suitable criteria. If desired, the transmit power threshold based on which the original candidate list of radios 12' is selected may be updated (e.g., decreased) to provide an updated candidate list of radios 12' for turning off.

After any suitable number of iterations, a finalized list of candidate radios 12' for turning off may be generated. Configurations in which table 42 in FIG. 3B and therefore list 46 forms the finalized list of candidate radios 12' to be turned off are sometimes described herein as an illustrative example.

As illustrated in column 66 of table 60 in FIG. 5, radios 12 that remain on may operate with the same transmit powers originally updated or optimized when all radios in the group are assumed to be on (e.g., the same transmit powers as those in column 58 of table 50 in FIG. 4). While these transmit powers may be optimal when all radios in the group are on, they may be suboptimal when only a subset of radios in the group is on.

As such, controller 34 and/or one or more access points 10 may determine an adjusted set of transmit powers to optimize the transmit powers of the radios 12 that remain on when accounting for the lack of any wireless coverage from the turned off radios 12' and therefore further adjust radios 12 kept on to operate with the adjusted set of transmit powers. Accordingly, FIG. 6 shows an illustrative table with a set of post-adjustment transmit powers shown in column 82 optimized for radios R1, R2, R3, R5, R7, and R15 when radios R4, R6, R8-R14, and R16 are assumed to be non-operational (e.g., placed in the off state).

This adjustment of transmit powers for the subset of radios that are kept on may use the same type of determination process initially used when all radios 12 were assumed to be on (e.g., as described in connection with FIG. 4 to obtain the transmit powers indicated in column 58). In particular, as shown in the example of FIG. 6, at least some of the radios (e.g., radios R1, R2, and R15) have post-adjustment transmit powers 84 that differ from pre-adjustment transmit powers 68 in FIG. 5. In general, at least some of the post-adjustment transmit powers may be larger than the pre-adjustment transmit powers to compensate for the turning off of some of the radios in the group.

Figure 7:
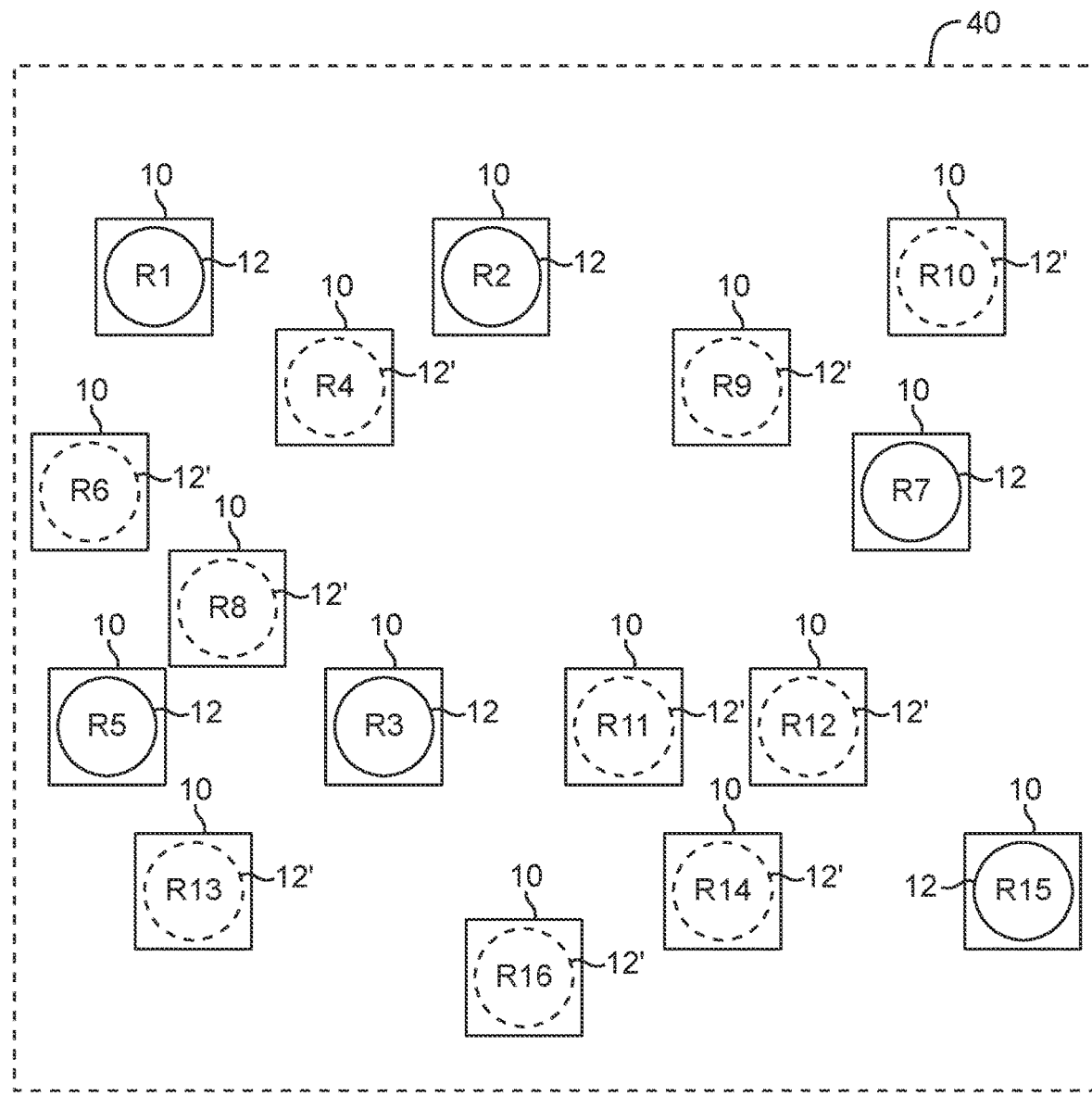
FIG. 7 is a diagram of an illustrative arrangement of radios for access points containing radios in both on and off states in accordance with some embodiments.

FIG. 7 is a diagram of an illustrative geographical area 40 across which some of the original group of radios R1-R16 (e.g., geographical area 40 in FIG. 2) are placed in an off state based on the operations described in connection with FIGS. 3-6. In the example of FIG. 7, radios R4, R6, R8-R14, and R16 may be placed in an off state while radios R1, R2, R3, R5, R7, and R15 may be placed in an on state and operate with corresponding post-adjustment transmit powers as shown in the example of FIG. 6 (e.g., transmit powers optimized for a configuration in which radios R4, R6, R8-R14, and R16 are turned off).

The number of radios (e.g., sixteen) in a given group or set of radios for covering a same radio-frequency band and the numbers of radios in the on and off states as described in connection with FIGS. 2-7 are merely illustrative. Similarly, the neighbor counts (e.g., the loud neighbors count, the target loud neighbor count threshold, and the radio-frequency neighbor count), transmit powers (e.g., the maximum and minimum transmit powers, initial transmit power, an updated transmit power for when each radio in the group is on, and an adjusted transmit power for when only a subset of the radio in the group is on) and other characteristics of each radio as described in connection with FIGS. 2-7 are also merely illustrative. If desired, the number of radios, the radio on-off states, the radio operational parameters, etc., may differ depending on the deployment.

Figure 8:
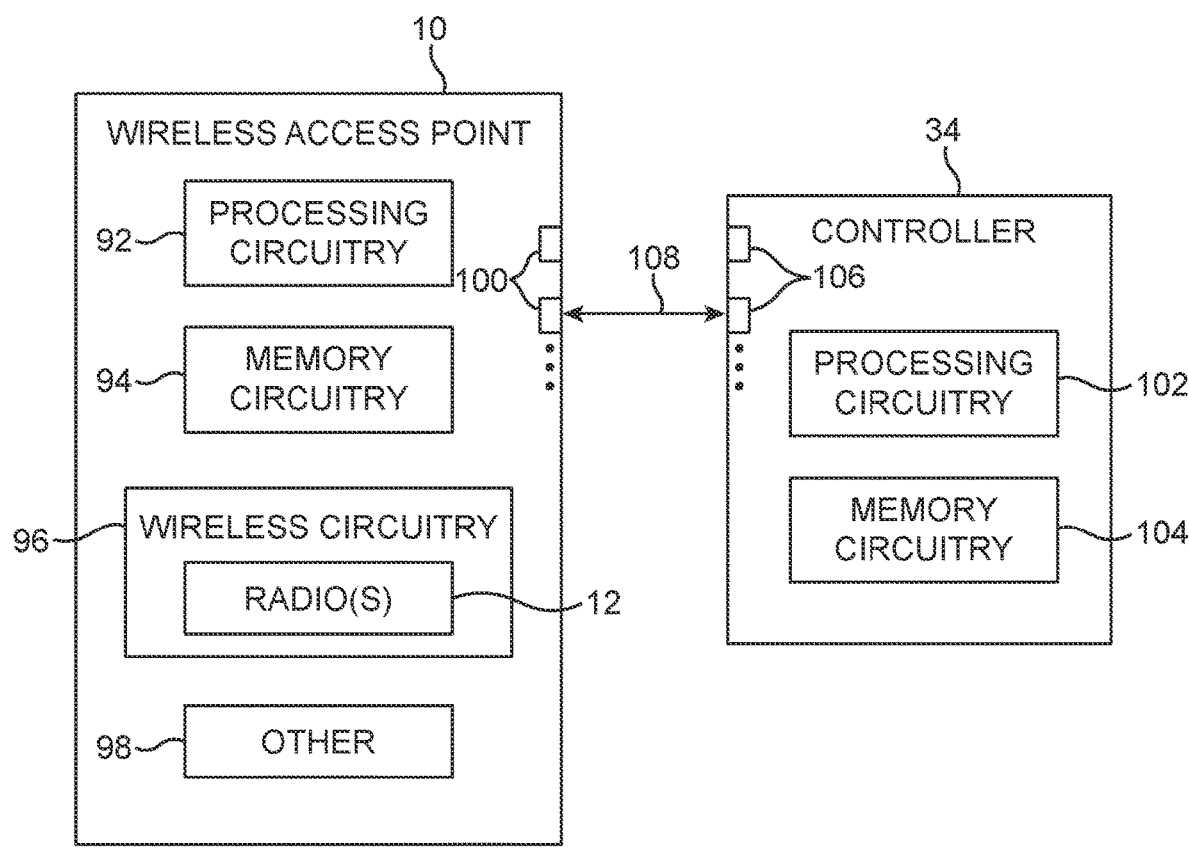
FIG. 8 is a diagram of an illustrative wireless access point and an illustrative controller for the wireless access point in accordance with some embodiments.

FIG. 8 is a diagram of illustrative hardware configurations for components within a wireless system such as one or more wireless access points (e.g., access points 10 in FIGS. 1, 2, and 7) optionally coupled to a wireless controller (e.g., wireless controller 34 in FIG. 1). As shown in FIG. 8, wireless access point 10 (e.g., used to perform at least some of the operations described in connection with FIGS. 2-7) may include processing circuitry 92, memory circuitry 94, wireless circuitry 96, and other components 98 such as input-output interfaces or ports 100.

In particular, processing circuitry 92 may include one or more processors or processing units based on microprocessors on general-purpose processors, microcontrollers, digital signal processors, programmable logic devices, application specific system processors (ASSPs), application specific integrated circuit (ASIC) processors, etc.

Memory circuitry 94 may include volatile memory such as dynamic random-access memory, static random-access memory, etc., and non-volatile memory such as hard-drive storage, solid-state storage, flash memory, etc. As examples, memory circuitry 94 may store the radio operational information for one or more radios (e.g., local radios on wireless access point 10 and/or radios on other wireless access points) such as the information depicted in FIGS. 3-6 and/or other information that facilitates the determination of and the control of radio on-off states and operations.

In general, the operations described herein relating to the operation of wireless access point 10 and/or other relevant operations may be stored as (software) instructions on one or more non-transitory computer-readable storage media (e.g., memory circuitry 94) in wireless access point 10. The corresponding processing circuitry (e.g., processing circuitry 92 in wireless access point 10) for these one or more non-transitory computer-readable storage media may process the respective instructions to perform the corresponding wireless access point operations, or more specifically, radio operations. Some portions of processing circuitry 92 and some portions of memory circuitry 94, collectively, may sometimes be referred to herein as the control circuitry of wireless access point 10 because the two are often collectively used to control one or more components (e.g., radio components) of wireless access point 10 to perform corresponding operations (e.g., by sending and/or receiving requests, control signals, data, etc.).

Wireless access point 10 may include wireless (communication) circuitry 96 to wirelessly communicate with host devices (e.g., host devices 20 in FIG. 1). Wireless communication circuitry 96 may include one or more radios 12 (e.g., Wi-Fi radios, cellular radios, baseband processors, etc.), radio-frequency transceiver circuitry, radio-frequency front-end circuitry, and one or more antennas. One or more radios 12 may use the one or more antennas to transmit radio-frequency signals to and receive radio-frequency signals from one or more host devices 20 (FIG. 1). While wireless communication circuitry 96 is shown as a separate element from processing circuitry 92, this is merely illustrative. If desired, portions of wireless communication circuitry 96 (e.g., radio functionalities) may be implemented on portions of processing circuitry 92.

Wireless access point 10 may include other components 98 such as one or more input-output interfaces or ports 100 such as Ethernet ports or other types of network interface ports that provided connections to other network elements (e.g., switches, routers, modems, controllers) in the network, power ports through which power is supplied to wireless access point 10, or other ports. In general, input-output components in wireless access point 10 may include communication interface components that provide a Bluetooth® interface, a Wi-Fi® interface, an Ethernet interface (e.g., one or more Ethernet ports), an optical interface, and/or other networking interfaces for connecting wireless access point 10 to the Internet, a local area network, a wide area network, a mobile network, other types of networks, and/or to another network device, peripheral devices, and/or other electronic components.

If desired, other components 98 on wireless access point 10 may include other input-output devices such as devices that provide output to a user such as a display device (e.g., one or more status lights) and/or devices that gather input from a user such as one or more buttons. If desired, other components 98 on wireless access point 10 may include one or more sensors such as radio-frequency sensors. If desired, wireless access point 10 may include other components 98 such as a system bus that couples the components of network device 10 to one another, to power management components, etc. In general, each component within wireless access point 10 may be interconnected to the control circuitry (e.g., processing circuitry 92 and/or memory circuitry 94) in wireless access point 10 via one or more paths that enable the reception and transmission of control signals and/or other data.

As further shown in FIG. 8, one or more wireless access points 10 may optionally be coupled to a wireless controller 34. Wireless controller 34 may include processing circuitry 102, memory circuitry 104, and other components such as input-output interfaces or ports 106.

In particular, processing circuitry 102 may include one or more processors or processing units based on microprocessors on general-purpose processors, microcontrollers, digital signal processors, programmable logic devices, application specific system processors (ASSPs), application specific integrated circuit (ASIC) processors, etc. Memory circuitry 104 may include volatile memory such as dynamic random-access memory, static random-access memory, etc., and non-volatile memory such as hard-drive storage, solid-state storage, flash memory, etc. As examples, memory circuitry 104 may store the radio operational information for one or more radios (e.g., each wireless access point 10 in spanning a particular geographical area such as those shown in FIGS. 2 and 7) such as the information depicted in FIGS. 3-6 and/or other information that facilitates the determination of and the control of radio on-off states and operations. Generally, radio operational and/or on-off state information (e.g., the information shown in the tables shown in FIGS. 3-6) may be stored at memory circuitry on one or more wireless access point 10 and/or controller 34 (e.g., may be distributed between the different components in any desired manner).

In general, the operations described herein relating to the operation of the wireless controller 34 and/or other relevant operations may be stored as (software) instructions on one or more non-transitory computer-readable storage media (e.g., memory circuitry 104) in controller 34. The corresponding processing circuitry (e.g., processing circuitry 102) in controller 34 for these one or more non-transitory computer-readable storage media may process the respective instructions to perform the corresponding controller operations. Some portions of processing circuitry 102 and some portions of memory circuitry 104, collectively, may sometimes be referred to herein as the control circuitry of controller 34 because the two are often collectively used to control one or more components internal to controller 34 and/or external to controller 34 to perform corresponding operations (e.g., by sending and/or receiving requests, control signals, data, etc.).

Controller 34 may be communicatively coupled to one or more wireless access points 10 via corresponding communication links 108. Communication links 108 may be implemented over software and/or hardware paths that enable controller 34 and access point 10 to convey control signals or other information (e.g., radio performance information, radio state information, etc.) between them, thereby serving as a communication path or link. Each communication link 108 may be implemented over a direct path (e.g., controller 34 is connected to access point 10 via no other intervening network nodes or elements) or an indirect path (e.g., controller 34 is connected to access point 10 via one or more intervening network nodes or elements). If desired, controller 34 may be wirelessly coupled to access point 10. Each access point 10 in network 8 (FIG. 1) may be coupled to and therefore communicate with centralized controller 34 using any of the above-mentioned means. If desired, access points 10 in network 8 may be coupled to multiple controllers 34 (e.g., different sets of access points 10 may be coupled to different controllers in a more distributed control scheme, access points 10 may be coupled to a redundant (back-up) controller, etc.).

Figure 9:
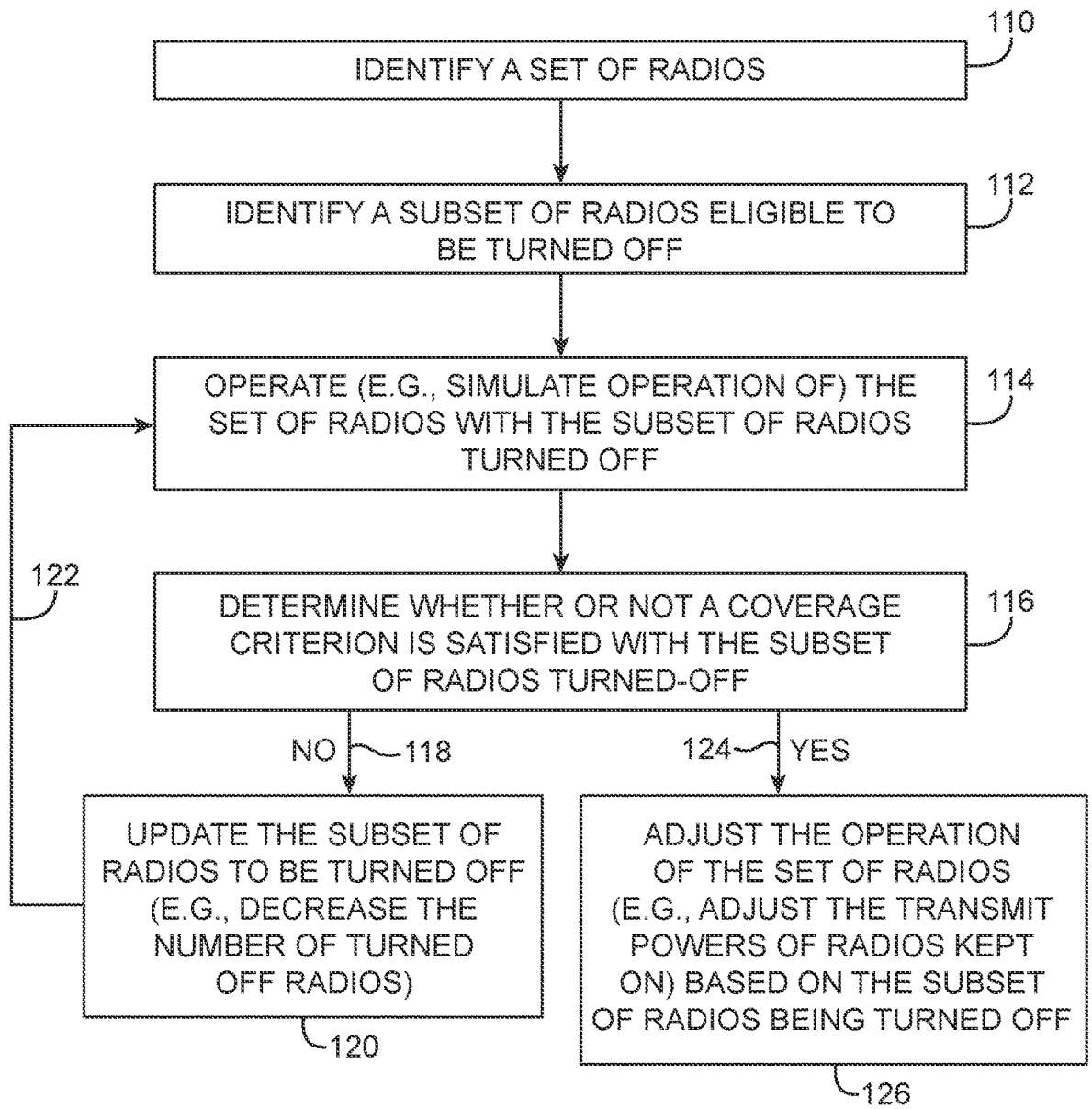
FIG. 9 is a flowchart of illustrative operations for determining states of radios in accordance with some embodiments.
Figure 10:
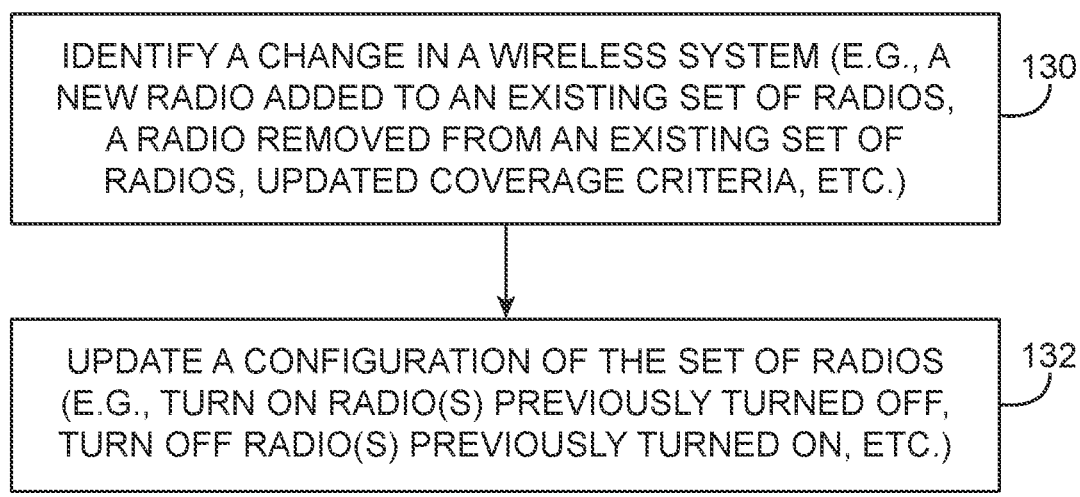
FIG. 10 is a flowchart of illustrative operations for adjusting states of radios over time in accordance with some embodiments.

FIGS. 9 and 10 are flowcharts of illustrative operations for operating a set of radios in a radio system. These operations may be performed at one or more (e.g., all) wireless access points 10 and/or controller 34 in network 8 (FIG. 1). The illustrative operations described in connection with FIGS. 9 and 10 may generally be performed using control circuitry at any combination of components in the wireless system of network 8 (e.g., using memory circuitry 94 and processing circuitry 92 in wireless access point 10 by executing software instructions stored on memory circuitry 94, using memory circuitry 104 and processing circuitry 102 in controller 34 by executing software instructions stored on memory circuitry 104, etc.). If desired, one or more operations described in connection with FIGS. 9 and 10 may be performed by other dedicated hardware components in access point 10 and/or controller 34 (e.g., wireless communication circuitry 96 and/or other components 98 in wireless access point 10 of FIG. 8).

In illustrative configuration described herein as an example, the operations described in connection with FIGS. 9 and 10 may be performed by one or more access points 10 and/or controller 34 in network 8.

FIG. 9 shows illustrative operations for selecting an optimal set of radios to turn off. In particular, at block 110, control circuitry in the wireless system (e.g., control circuitry on one or more wireless access points 10 and/or on controller 34) may identify a set of radios operable for a same radio-frequency band. The set of radios may be identified as part of a physical deployment to a geographical area across which wireless coverage is desired and/or may occur within a wireless coverage planning tool (e.g., in a software environment implemented on computing equipment such as one or more processors) that simulates the physical deployment. If desired, radio operational information and/or radio state information may be distributed (from each access point) to a controller 34 and/or distributed amongst the group of access points to identify the set of radios (e.g., as part of the identification of the set of radios). As examples, the distributed information may include neighbor count information, loud neighbor count information, transmit power information, on-off state information, and/or other suitable information described in connection with FIGS. 3 and 4.

At block 112, control circuitry in the wireless system (e.g., control circuitry on one or more wireless access points 10 and/or on controller 34) may identify a subset of radios eligible to be turned off. In particular, as described in connection with FIGS. 3-5, the control circuitry may determine a candidate list of radios to be turned off. This determination may be based on an updated or optimized set of transmit powers with which the set of radios operate (e.g., transmit powers in column 58 in FIG. 4) relative to a transmit power threshold and/or may be based on other information indicative of wireless coverage such as a density of radios at different regions within the deployment area, topography and geography of the deployment area, user input such as user-defined heuristics or criteria, etc.

At block 114, control circuitry in the wireless system (e.g., control circuitry on one or more wireless access points 10 and/or on controller 34) may operate the set of radios with the subset of radios turned off to test the operation of the set of radios when the subset of radios are non-operational. If desired, the control circuitry may simulate (e.g., via a wireless coverage planning tool or other software tools in a software environment implemented on computing equipment such as one or more processors) the operation of the set of radios with the subset of radios turned off instead of or in addition to physical operating the radios in the same manner.

At block 116, based on the operation and/or simulation performed at block 114, control circuitry in the wireless system (e.g., control circuitry on one or more wireless access points 10 and/or on controller 34) may determine whether or not one or more wireless coverage criteria are satisfied by the set of radios when the subset of radios are turned-off. The wireless coverage criteria may be based on a target neighbor count threshold (e.g., a target loud neighbor count threshold, a target radio-frequency neighbor count threshold, another type of minimum neighbor count threshold indicative of a satisfactory amount of wireless coverage) and/or may be based on other criterion such as a data throughput criterion, a user-defined criterion for the group of radios, etc.

If the one or more wireless coverage criteria are not satisfied, processing may proceed via path 118 to block 120. At block 120, control circuitry in the wireless system (e.g., control circuitry on one or more wireless access points 10 and/or on controller 34) may update the subset of radios turned off. In particular, as described in connection with FIGS. 3B and 3C, one or more radios (e.g., radio R12) may be changed from being a radio to be turned off to a radio to be kept on. If desired, in other illustrative scenarios (e.g., when there is still too much wireless coverage overlap or co-channel interference), radios originally to be kept on may be added to the subset of radios to be turned off. As described in connection with FIGS. 3-5, radios to be removed from (or to be added to) the subset of radios turned off may be preferentially selected based on one or more characteristics of these radios such as transmit power, relative location, and/or other operating parameters that otherwise help satisfy the one or more coverage criteria at block 116.

Processing may then loop back via path 122 to block 114, at which the updated subset of radios to be turned off may be again assessed at blocks 114 and 116. Any suitable number of iterations of processing blocks 114, 116, and 120 via paths 118 and 122 may occur before a satisfactory subset of radios to be turned off is finally determined at block 116.

Accordingly, when the one or more wireless coverage criteria are satisfied, processing may proceed from block 116 via path 124 to block 126. At block 126, control circuitry in the wireless system (e.g., control circuitry on one or more wireless access points 10 and/or on controller 34) may adjust the operation of the set of radios (e.g., adjust the transmit power of radios kept on) based on the subset of radios turned off. In particular, as described in connection with FIGS. 5 and 6, the control circuitry may determine an adjusted set of transmit powers optimized for the operation of the group of radios excluding the subset of radios turned off (e.g., the operation of only a subset of the group being kept on) to replace the pre-adjustment transmit powers optimized for the operation of the group of radios (e.g., the operation of the entire group being kept on).

While illustrative configurations in which the operations described in connection with FIG. 9 are described relative to when a set of radios is deployed or otherwise simulated for deployment, this is merely illustrative. If desired, the operations described in connection with FIG. 9 and generally herein may be performed at any suitable time (e.g., before deployment of the set of radios to a physical area, after the set of radios have been deployed to a physical area, periodically and/or based on user-input across the lifetime of the wireless system, in response to one or more criteria that trigger the (re)assessment of radio on-off states, etc.).

In particular, FIG. 10 shows illustrative operations for dynamically performing on-off state adjustment (e.g., by dynamically performing the operations of FIG. 9) for the wireless system containing the one or more wireless access points 10 and optionally one or more wireless controllers 34. In particular, at block 130, control circuitry in the wireless system (e.g., control circuitry on one or more wireless access points 10 and/or on controller 34) may identify a change in the wireless system containing the set of radios operating to provide wireless coverage in the same radio-frequency band. As examples, the change in the wireless system may include the addition (in a newly added wireless access point) of a new radio operating in the same radio-frequency band to the existing set of radios, the removal of an existing radio from the existing set of radios, the update of wireless coverage criteria or parameters, and/or other changes in the wireless system that may influence the operation of the set of radios.

At block 132, control circuitry in the wireless system (e.g., control circuitry on one or more wireless access points 10 and/or on controller 34) may update a configuration of the set of radios based on the change identified at block 130. As examples, the updating of the configuration may include turning on one or more previously turned-off radios, turning off one or more previously turned-on radios, changing the transmit power of one or more radios, and/or any other changes to the operational mode of one or more radios or the wireless system in general. Configurations in which one or more operations described in connection with FIG. 9 are performed at block 132 are sometimes described herein as an illustrative example.

The operations described in connection with FIGS. 9 and 10 are merely illustrative. If desired, one or more of these operations may be omitted and/or changed. If desired, one or more additional operations may be performed as part of each of the operations described in connection with FIGS. 9 and 10. If desired, the operations described in connection with FIGS. 9 and 10 may be performed in parallel across multiple components of the wireless system such as multiple access points 10 and/or controller 34, sequentially at only a single component of the wireless system such as at controller 34 or a given access point 10.

The methods and operations described above in connection with FIGS. 1-10 may be performed by the components of one or more network devices and/or server or other host equipment using software, firmware, and/or hardware (e.g., dedicated circuitry or hardware). Software code for performing these operations may be stored on non-transitory computer readable storage media (e.g., tangible computer readable storage media) stored on one or more of the components of the network device(s) and/or server or other host equipment. The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of the network device(s) and/or server or other host equipment (e.g., processing circuitry 92 in access points 10 of FIGS. 1 and 8, processing circuitry 102 in controller 34 in FIGS. 1 and 8, etc.).

The foregoing is merely illustrative and various modifications can be made to the described embodiments. The foregoing embodiments may be implemented individually or in any combination.

What is claimed is:

1. A method of determining on-off states of a set of radios for a same radio-frequency band in corresponding wireless access points, the method comprising:
    determining a transmit power for each radio in the set of radios;
    identifying a subset of radios from the set for which the one or more determined transmit powers are less than a transmit power threshold;
    turning off each radio in the subset of radios;
    determining updated transmit powers for the set of radios excluding the subset of radios based on the subset of radios being turned off; and
    operating the set of radios excluding the subset of radios using the updated transmit powers.

2. The method of claim 1 further comprising:
    identifying a target neighbor count threshold indicative of a number of radios that neighbor a given radio based on a signal strength threshold of a received signal from the given radio, wherein determining the transmit power for each radio in the set of radios is based on the target neighbor count threshold.

3. The method of claim 2, wherein each radio in the set of radios, when operating at the determined transmit power, has a corresponding neighbor count that satisfies the target neighbor count threshold.

4. The method of claim 2, wherein the updated transmit powers for the set of radios excluding the subset of radios are based on the target neighbor count threshold.

5. The method of claim 4, wherein the set of radios excluding the subset of radios, when operating at the updated transmit powers and with the subset of radios turned off, each has a corresponding neighbor count that satisfies the target neighbor count threshold.

6. The method of claim 1 further comprising:
    determining whether or not turning off each radio in the subset of radios satisfies a wireless coverage criterion.

7. The method of claim 6 further comprising:
    in response to determining that turning off each radio in the subset of radios does not satisfy the wireless coverage criterion, updating the subset of radios to be turned off to satisfy the wireless coverage criterion.

8. The method of claim 7, wherein turning off each radio in the subset of radios is in response to determining that turning off each radio in the subset of radios satisfies the wireless coverage criterion.

9. The method of claim 7, wherein updating the subset of radios to be turned off comprises reducing a number of radios in the subset of radios to be turned off.

10. The method of claim 9, wherein reducing the number of radios in the subset of radios to be turned off is based on a magnitude of the determined transmit power for each radio in the subset of radios.

11. The method of claim 6, wherein the wireless coverage criterion comprises a determination of whether each radio in the set of radios excluding the subset of radios, when operating at the determined transmit power, has a corresponding neighbor count that satisfies a target neighbor count threshold.

12. The method of claim 1, wherein each radio in the set of radios is configured to operate in a same wireless local area network (WLAN) radio-frequency band.

13. The method of claim 12, wherein the wireless access points are multi-band wireless access points configured to operate in multiple WLAN radio-frequency bands.

14. The method of claim 1, wherein each radio in the set of radios is configured to operate in a same cellular radio-frequency band.

15. One or more non-transitory computer-readable storage media comprising computer-executable instructions that, when executed by one or more processors for a wireless system, cause the one or more processors to:
    identify a group of multi-band access points, each multi-band access point containing at least a first radio operable to convey radio-frequency signals at a first set of frequencies and a second radio operable to convey radio-frequency signals at a second set of frequencies at least some of which are higher than the first set of frequencies;
    determine a candidate list of the first radios containing first radios eligible to be placed in an off state;
    determine whether operation of the first radios, with the first radios in the candidate list placed in the off state, satisfies a wireless coverage criterion;
    determine a transmit power for each of the first radios excluding the first radios in the candidate list; and
    operate each of the first radios excluding the first radios in the candidate list based on the determined transmit power and place the first radios in the candidate list in the off state.

16. The one or more non-transitory computer-readable storage media of claim 15, wherein the wireless coverage criterion comprises a minimum neighbor count of each of the first radios excluding the first radios in the candidate list.

17. The one or more non-transitory computer-readable storage media of claim 16 further comprising computer-executable instructions that, when executed by the one or more processors for the wireless system, cause the one or more processors to:
    update the candidate list of the first radios until operation of the first radios with the first radios in the updated candidate list placed in the off state satisfies the wireless coverage criterion.

18. The one or more non-transitory computer-readable storage media of claim 17, wherein the candidate list of the first radios is updated by iteratively removing one or more of the first radios from the candidate list until operation of the first radios with the first radios in the updated candidate list placed in the off state satisfies the wireless coverage criterion.

19. One or more non-transitory computer-readable storage media comprising computer-executable instructions that, when executed by one or more processors in a wireless system, cause the one or more processors to:
    identify a group of radios operable in a wireless local area network (WLAN) radio-frequency band in corresponding wireless access points;
    determine a first subset of radios in the group to be placed in an on state;
    determine a second subset of radios in the group to be placed in an off state;
    determine whether operation of the first subset of radios in the on state and the second subset of radios in the off state satisfies a criterion indicative of a target wireless coverage for the WLAN radio-frequency band;

place the radios in the second subset in the off state based on the criterion being satisfied;

determine transmit powers for the radios in the first subset based on the radios in the second subset being placed in the off state; and operate the radios in the first subset based on the determined transmit powers.

20. The one or more non-transitory computer-readable storage media of claim 19 further comprising computer-executable instructions that, when executed by the one or more processors in the wireless system, cause the one or more processors to:

in response to the criterion not being satisfied, update the first subset of radios and the second subset of radios at least in part by moving radios in the second subset to the first subset.

* * * * *